No. 676,025. Patented June 11, 1901.
G. A. BRONDER.
GAS RETORT CHARGING APPARATUS.
(Application filed Jan. 2, 1900.)
(No Model.)  5 Sheets—Sheet 1.
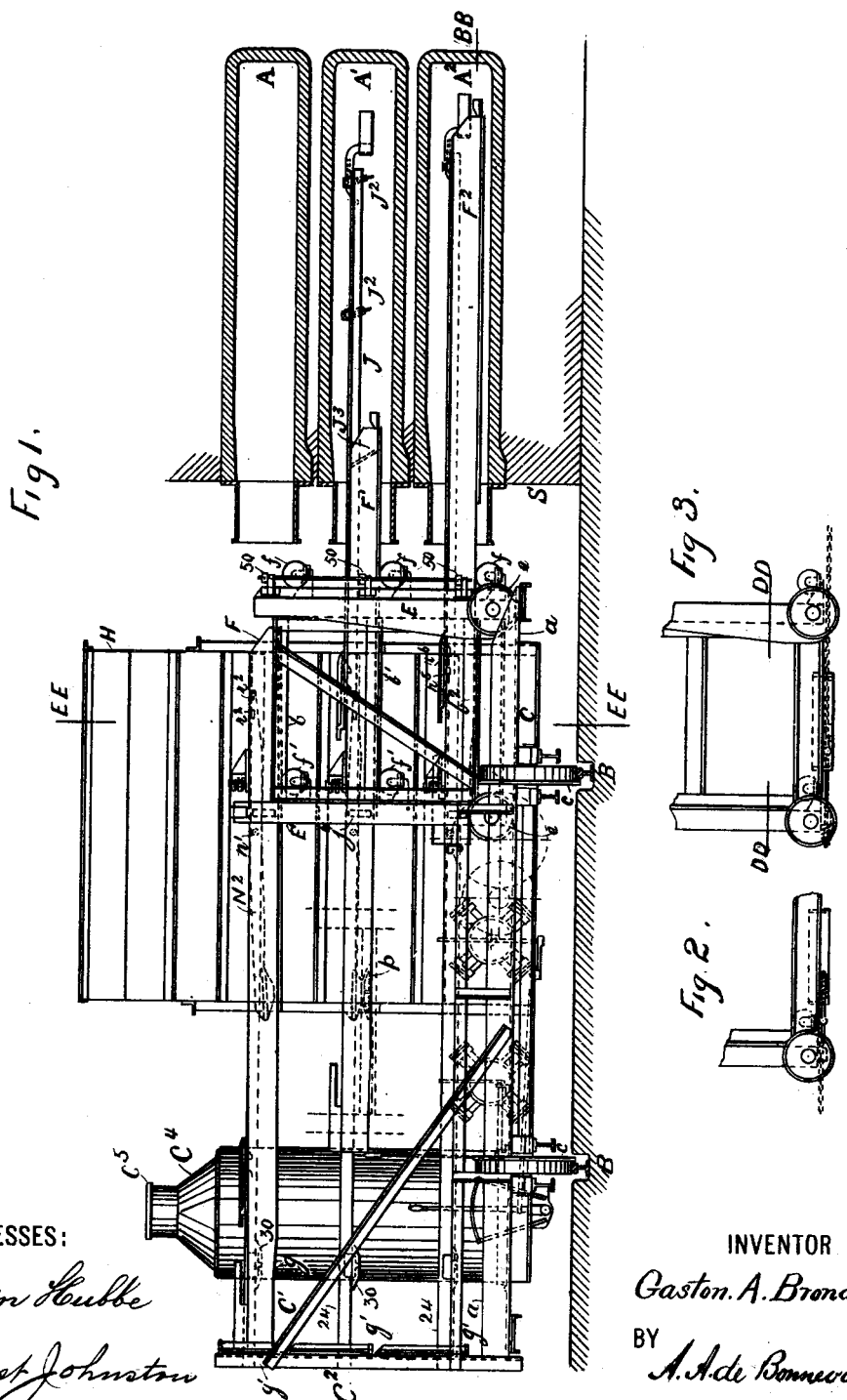
WITNESSES:
Martin Hubbe
August Johnston
INVENTOR
Gaston. A. Bronder
BY
A. A. de Bonneville
ATTORNEY No. 676,025. Patented June 11, 1901.
G. A. BRONDER.
GAS RETORT CHARGING APPARATUS.
(Application filed Jan. 2, 1900.)
(No Model.) 5 Sheets—Sheet 2.
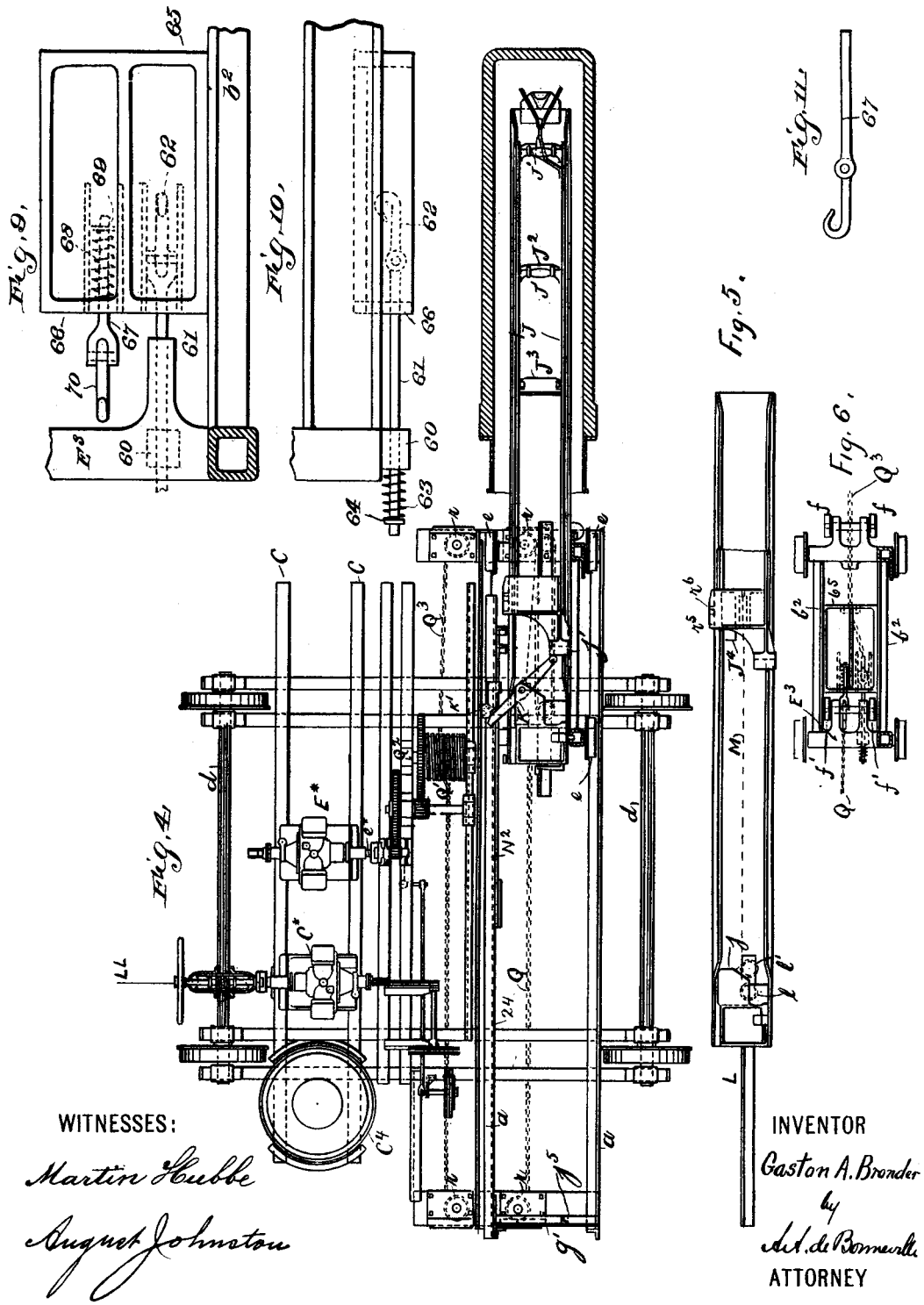
WITNESSES:
Martin Hubbe
August Johnston
INVENTOR
Gaston A. Bronder
by
Ad. de Bonneville
ATTORNEY No. 676,025. Patented June 11, 1901.
G. A. BRONDER.
GAS RETORT CHARGING APPARATUS.
(Application filed Jan. 2, 1900.)
(No Model.) 5 Sheets—Sheet 3.

Fig 7.

Fig 8.

WITNESSES:
Martin Hubbe
August Johnston

INVENTOR
Gaston A. Bronder
BY
A. A. de Bonneville.
ATTORNEY

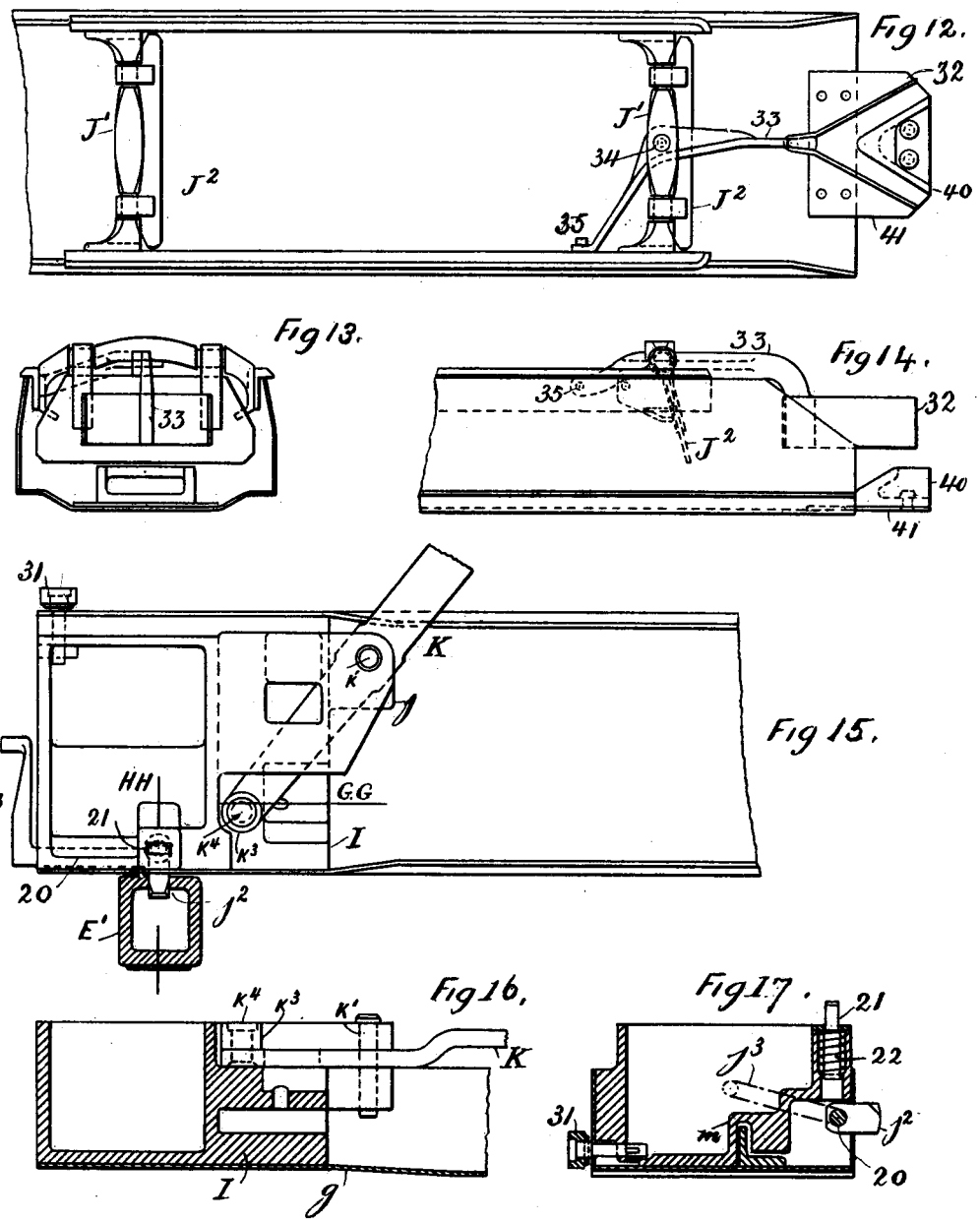

No. 676,025. Patented June 11, 1901.
G. A. BRONDER.
GAS RETORT CHARGING APPARATUS.
(Application filed Jan. 2, 1900.)
(No Model.) 5 Sheets—Sheet 5.
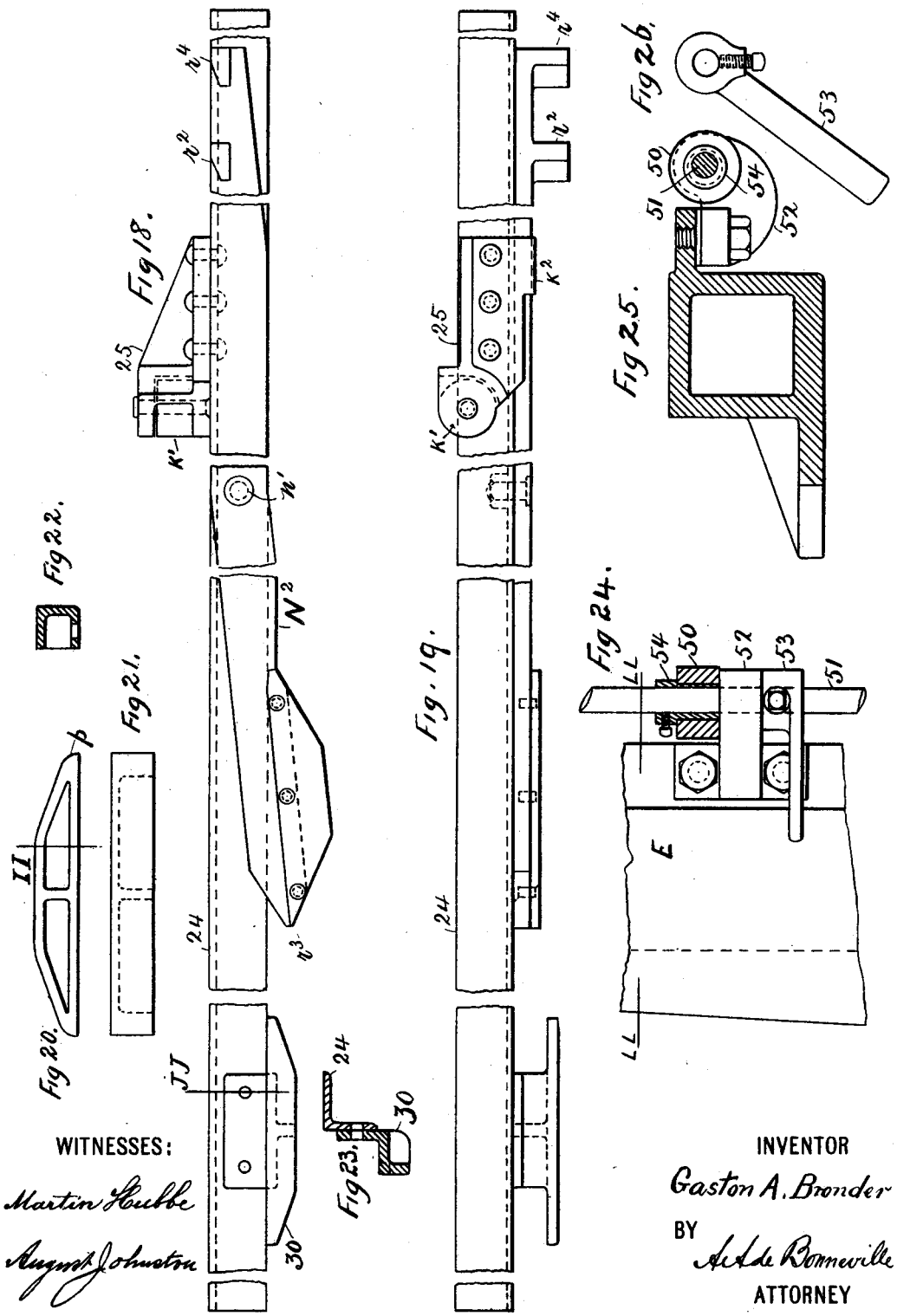
WITNESSES:
Martin Hubbe
August Johnston
INVENTOR
Gaston A. Bronder
BY
A. A. de Bonneville
ATTORNEY

UNITED STATES PATENT OFFICE.

GASTON A. BRONDER, OF NEW YORK, N. Y.

GAS-RETORT-CHARGING APPARATUS.

SPECIFICATION forming part of Letters Patent No. 676,025, dated June 11, 1901.

Application filed January 2, 1900. Serial No. 131. (No model.)

*To all whom it may concern:*

Be it known that I, GASTON A. BRONDER, a citizen of the United States, and a resident of New York, in the county of New York and State of New York, have invented certain new and useful Improvements in Gas-Retort-Charging Apparatus, of which the following is a specification.

My invention relates to improvements in gas-retort-charging apparatus, the nature of which is fully shown, described, and pointed out in the drawings, specification, and claims presented herewith. In my Letters Patent No. 534,422, dated February 19, 1895, a gas-retort-charging apparatus is also claimed, and this application consists in improvements in such apparatus.

To thoroughly understand the improvements which constitute the subject-matter of this application, it will be necessary to repeat here the essential elements constituting my gas-retort-charging apparatus claimed in my said Letters Patent No. 534,422 and then point out the improvements which constitute the novel features of this invention. In the said Letters Patent granted to me an apparatus is claimed by means of which retorts in retort-stacks are charged in a novel manner. A retort-stack house is shown in the said patent with tracks running in close proximity to and parallel to the mouthpieces on each side of the retort-stacks. A double carriage is run on the tracks under its own steam and propelling-gear, consisting of a main carriage and a cross-carriage, termed a "scoop-carriage," carrying scoops, which charge the retorts. The main carriage is fed with coal from bins spanning the retort-house across its width and between the adjacent ends of two retort-stacks placed longitudinally in the house.

The main objects of the present application are to dispense with the boiler and water-tank carried on the main carriage and substitute a steam-receiver, novel locking devices for the scraper-frame and scoops, adjusting attachments to direct the scoops in proper operative positions into the retorts, plows for properly distributing the coal fed into the retorts, and chains fitted with elastic mediums to prevent shocks or jars when the movements of the scoop-carriage are stopped and reversed.

Figure 1 shows a vertical sectional view of three retorts arranged one above another and an elevation of the double carriage with its scoops and scraper-frames in operative and inoperative positions. Figs. 2 and 3 are fragmentary elevations of the scoop-carriage, showing bumper-springs. Fig. 4 is a fragmentary horizontal section of my apparatus, taken on the line B B of Fig. 1. Fig. 5 shows a plan of one scoop with a portion of scraper-frame and backing-bar in operative position. Fig. 6 represents a sectional plan of the cross-carriage on the line D D D D of Fig. 3. Fig. 7 is a fragmentary vertical section on the line E E E E of Fig. 1, showing sections of the hopper, scoops, and scraper-frames. Fig. 8 represents a fragmentary elevation of the left-hand end of the main carriage, showing the rear ends of the scoops. Fig. 9 shows a fragmentary sectional plan of the scoop-carriage on the line D D D D of Fig. 3. Fig. 10 is an elevation of Fig. 9. Fig. 11 shows a detail of Figs. 9 and 10. Fig. 12 is a plan, on an enlarged scale, of the front end of one of the scoops with its scraper-frame and plows. Figs. 13 and 14 are respectively an end view and elevation of Fig. 12. Fig. 15 is an enlarged fragmentary view of the rear end of a scoop with a section through the rear column of the scoop-carriage on the line D D of Fig. 3. Fig. 16 represents a section on the line G G of Fig. 15. Fig. 17 shows a section on the line H H of Fig. 15. Fig. 18 is an elevation of one of the locking-bars attached to its supporting-angle. Fig. 19 is a plan of Fig. 18. Figs. 20 and 21 show, respectively, an elevation and plan of the unlocking-cam. Fig. 22 is a section on the line I I of Fig. 20. Fig. 23 shows a section on the line J J of Fig. 18. Fig. 24 is a fragmentary elevation, partly in section, of the front column of the scoop-carriage, showing the friction and adjusting roller with an eccentric bushing. Fig. 25 is a sectional plan view on line L L L L of Fig. 24. Fig 26 is a plan view of lever controlling friction and adjusting rollers.

Referring to Figs. 1 to 8, one of my double charging-carriages is shown, omitting in Fig. 4 the hopper to avoid confusion. The main carriage has embodied with or fixed upon it tracks $a\ a$, which are arranged transversely to the stationary track on the floor of the retort-house, the said tracks $a\ a$ receiving the supporting-wheels $e\ e$ of a second carriage, which I term the "scoop-carriage," and carries the scoops $F\ F'\ F^2$, which correspond in number with the tiers of the retorts in the stack, and which are arranged, as shown in Figs. 1, 7, and 8, at such heights as to be capable of entering, respectively, a retort of each of the tiers in the stack. The main carriage $C\ C'\ C^2$ has also supported upon it by columns $H'\ H'$ a coal-hopper H for receiving coal from bins and to supply it to the scoops. The said hopper H is situated at one side of the scoop-carriage tracks $a\ a$ and is, as shown in Fig. 7, divided into three compartments $h\ h'\ h^2$, of about equal capacity, one for supplying each of the scoops. In the construction represented here there is also on the main carriage $C\ C'\ C^2$ two steam-engines, the engine $C^*$ for propelling the main carriage along the stationary track and along the range of retorts, and the engine $E^*$ for propelling the scoop-carriage $E\ E'$ back and forth on the tracks $a\ a$ for the purpose of carrying the scoops forward from the side of the coal-hopper into the retorts to charge the latter and to withdraw them therefrom. The scoop-carriage is provided with scoop-supports consisting of brackets $b\ b'\ b^2$, arranged one above another, one for each scoop, and under each of these brackets are bearings for the journals of the rollers $f\ f'$, upon which the scoops are placed, the upper parts of said rollers protruding upward through openings in the brackets, the rollers $f'$ being at the rear end of the carriage and the rollers $f$ at the front end, as shown in Figs. 1 and 6. The front rollers $f$ of each scoop-support constitute the fulcrum upon which the scoop oscillates as a scale-beam, weighing the coal received from the charging-hopper H, as will be hereinafter described, and both rollers serve to reduce the friction between the scoop-carriage and any scoop that may be locked back to the main carriage $C\ C'\ C^2$ (in which position the uppermost scoop is shown in Fig. 1) when it is desired to keep that scoop inoperative while the scoop-carriage runs back and forth with the others, as when it is only desired to charge retorts in less than the whole number of tiers.

To provide for locking the several scoops or any number of them operatively to the scoop-carriage, a locking device is employed, the special construction of which is new, as explained hereinafter.

The scoops, the construction of which is best shown in Figs. 1, 4, 5, and 12 to 17, consist each of a long box or trough built of steel and open at the top and the forward end. The rear end of the bottom is cut away or recessed, as shown at $g$, Fig. 16, to permit the oscillation of the scoop on the forward rollers $f$, and at the said end there is a permanent weight I, by which the scoop is balanced horizontally with the coal charge in it and weighed down when empty, so as to lift or tilt up the forward end somewhat. This permanent weight may be sufficient for the minimum charge, and changeable weights may be added for heavier charges. While the scoop is in use, it is locked to its carriage $E\ E'$ by my new combined crank and locking-bolt, fully described hereinafter, and when it is brought back by this carriage to the position for charging its back end is stopped by and eventually lies on an angle-iron bar $g'$, Figs. 4 and 8, fastened to the main carriage. When the proper coal charge is put into the scoop, it balances the weight I, weighing the coal exactly and showing to the attendant who has control of the charging that the proper charge is attained. Within the scoop and lying loose upon the upper edges thereof is a scraper-frame J, Fig. 4, consisting of angle-iron side bars and cross-braces $J'$ and carrying a series of scrapers $J^2$, of which several are pivoted to the cross-braces in such a manner that their lower edges will swing forward to allow them to pass backward freely over any coal underneath them, but will stop the coal in front of them. The rearmost, $J^3$, of these scrapers is rigid, and it forms the back coal-space in the scoop, while the bumper $J^4$, Fig. 5, is drawn back against a stop $j$ in the scoop, as shown, which is new in this application. The scraper-frame is capable of a movement back and forth relatively to the scoop to an extent a little greater than the length of that part of the scoop which contains the charge in order that, first, after the scoop, with the scraper-frame in it, has been moved forward into the retort, with the charge of coal in it, nearly to the back end of the retort, as illustrated by $F^2$ in Fig. 1, the scraper may have a still further movement to push the charge of coal up to the extreme rear end of the retort, and, second, that the scoop may while the scrapers remain thus pushed forward move back far enough, as illustrated by $F'$, Fig. 1, to be withdrawn from the charge in the retort while the scrapers continue to hold back the charge. In order to counterbalance the weight of that portion of the scraper-frame which, with the scrapers, projects beyond the end of the scoop during and immediately after the discharge of the scoop from the retort, as just described, the said frame is loaded at its rear end by a weight $j'$, Fig. 4. For the purpose of producing the continued movement, just described, of the scrapers within the scoop beyond the movement of the latter within the retort a lever K, Figs. 4, 15, and 16, is pivoted by a fulcrum-pin $k'$ to the weight I or back part of the scoop, one end of said lever bearing against the said weight $j'$ or back part of the scraper-frame and the other end projecting laterally from the scoop, so that during the latter part of the forward movement of the scoop the said projecting end comes in contact with a roller-stop $k''$, carried on the locking-bar angles, which is an improvement on my old device, after which the continued forward movement of the scoop causes the scraper-frame and scrapers to move forward with an accelerated velocity relatively to the scraper. At one end of the lever K, I attach the roller $k^3$, which turns on the pin $k^4$. The drawing back of the scraper-frame to bring the scrapers back into the scoop is effected by means of a bar L, which I term the "backing-bar," two pulleys $l$ $l'$, and a wire, rope, or chain M. (Shown in Figs. 4 and 5.) The backing-bar is fitted to slide back and forth lengthwise of the scoop in guides provided within the same. While the scraper-frame is held stationary, as described, to permit the discharge of the coal into the retort by the drawing back of the scoop the backing-bar L is projected back through the rear of the scoop with a movement of two to one in proportion to the movement of the scoop by means of the pull of the scoop on rope or chain M, passing around the pulleys $l$ $l'$. This projection of the backing-bar continues until the scraper-frame has been unlocked by the lifting of the locking-bar, disengaging the hooks on the said bar from corresponding hooks on the end of the scraper-frame, which device is new and will be fully explained. The backing-bar is then immediately by the continued movement of the scoop brought against the stop $g'$, hereinbefore mentioned, on the main carriage C C' $C^2$, and by the further continued backward movement of the scoop while the said bar is so stopped the said bar is caused to be returned within the scoop, and by the action of the rope or chain M and pulleys $l$ $l'$ to draw back the scrapers to the position they are to occupy while the latter is being charged and while it is running to charge the retort.

The steam-engine E*, hereinbefore briefly referred to, for driving the scoop-carriage gives motion to said carriage by means of chains or wire ropes Q $Q^3$, which run around and are driven by a drum Q' on a horizontal shaft $Q^2$, mounted in suitable bearings on the main carriage C C' $C^2$, the said chains or ropes running around pulleys $r$ $r$, arranged on the said carriage near opposite ends thereof. These chains are connected to the said carriage with spring connections to prevent jar, as hereinafter described. The said shaft $Q^2$ is geared with and derives motion from the shaft $e^*$ of the engine E* by a train of gearing. The engine E* is furnished with a reversing-valve and reversing-gear, which may be of any suitable kind.

The steam-engine C*, hereinbefore referred to, for moving the main carriage along the faces of the retort-stacks is geared with one of the axles $d$ of the main carriage by an endless screw on the shaft of the said engine and a worm-gear on the said axle. The said engine C* is furnished with a reversing-valve and a reversing-gear, which may be of any kind.

I will now describe some more of the novel features of my invention distinguishing this application, and referring to Figs. 1, 8, 15, and 17 my novel method of locking the scoops to either carriage by my combined crank and locking-bolt are shown.

In Figs. 1 and 8 the scoop F is shown locked to the main carriage by means of the handle $j^3$ of the combined crank and bolt, locking it with the upright $j^5$ of the main carriage.

In Fig. 15 a plan view of the crank and locking-bolt is shown with a section through the upright E' of the carriage on a horizontal plane through the center of the bolt $j^2$, and in this figure the locking-bolt is shown to secure the scoop to the scoop-carriage, which is also the case with the scoops $F^2$ and F' in Figs. 1 and 8. The new and novel feature of this locking device consists in the crank-handle $j^3$, which by virtue of its weight keeps the scoop locked either to the main carriage or scoop-carriage, which result is obtained by swinging it to either the right or left. The combined crank and locking-bolt is shown to consist of the axle 20, connecting the crank $j^3$ and bolt $j^2$. The crank $j^3$ being heavier than the bolt $j^2$, the weight of $j^3$ keeps the device locked in either position.

Referring again to Figs. 7, 15, and 17, the buffer-bolt 21, with spring 22, is shown for taking the shock of the vertical movements of the scoop, allowing the scoop to take a tilted position if the roof of the retort is low. The bolts of the spring-buffer strike the projections 23 on the scoop-carriage.

Referring to Figs. 1, 4, 5, and 7 and 18 to 22, inclusive, the method of controlling the detention of the scrapers within the retorts for the purpose of scraping the charge of coal from the scoops as the latter are moved back by the scoop-carriage is shown and is new in this application. To the locking-bar angles 24 the locking-bars $N^2$ are journaled on the pins $n'$. The locking-bars terminate at the front ends in the detaining-hooks $r^2$ $r^4$, which are represented in their normal positions and ready to detain the scraper-frame in the bottom locking-bar $F^2$, Fig. 1, it being so fulcrumed that the weight of the end $r^3$ brings the other end against the projecting portion $K^2$ of the roller-stop housing 25, carried on the locking-bar angle 24. When the scoop, with its scraper-frame, is withdrawn from the retorts, the projecting hooks $r^5$ $r^6$ are locked with the hooks $r^2$ and $r^4$ of the locking-bars, double hooks being on each of the engaging members. Each hook of one member can be locked by either hook of the other, thus allowing the scoops to enter the retorts to different depths and still the locking device remaining effective. The scraper-frame J in the middle retort shows its position when fully retained in the said retort and the scoop brought forward far enough for the scoop-carriage to have scraped all the coal off the scoop. The locking-bars are, in fact, shown out of engagement, having just been raised by the action of the unlocking or tipping cam $p$, carried on the horizontal inner braces of the scoop-carriage, which raises the outward ends $r^3$ of the locking-bars and naturally lowers the other ends of the same, and consequently lowers out of engagement the locking-hooks. The position of the scoop-carriage for this relative position of the locking-hooks is shown in dotted lines in Fig. 1.

Another new feature for controlling the motion of the scoops consists in the resultant action of the adjusting-cams 30, Figs. 1, 18, 19, 22, and 23, attached to the locking-bar angles 24 and the adjusting-rollers 31, Figs. 15 and 17, attached to the scoops. The rollers being located at the outward end of the scoops and the cams near the outward end of the locking-bar angles raises the front ends of the scoops in proper horizontal positions to enter the mouthpieces of the retorts.

Additional new features of the scraper frames and scoops, which I term "scraper-frame plows" and "scoop-plows," are shown in Figs. 1, 4, 9, 12, 13, and 14, and the object of them is to spread the coal toward the sides of the retorts. The scraper-frame plow 32, which I generally make of triangular form, as shown, is attached to the front cross-brace J'. The longitudinal bar thereof 33 is bolted to J' by the bolt 34. The said bar is also secured to the side of the scraper-frame by the bolt 35. The bar 33 is turned down at right angles at its outer end, where it is attached to the blades 32. The scoop-plow 40, which I also generally make of triangular shape, as shown, is attached to the scoop by being secured to a plate 41, which in turn is fastened to the bottom plate of the scoop. The scraper-blades $J^2$ are made of proper length to allow the scoop-plow 40 to pass under them. The action of both plows is novel. The scoop-plow traveling with the scoop runs through the coal in close proximity to the bottom of the retort, and after having finished its stroke the scraper-frame plow follows it at a higher level, insuring the proper spreading of the coal in the retorts.

Referring now to Figs. 1 and 23 to 26, I show my method of retaining the scoops in proper horizontal position, and to prevent their approaching too closely the columns E E' of the scoop-carriage and to obviate the same I attach my friction and adjusting rollers 50, which are carried on a spindle 51, secured by brackets 52, fastened to the column E of the scoop-carriage. On the spindle 51 is secured an eccentric bushing 54, on which the rollers 50 turn. A handle 53 is fastened to the spindle 51, by means of which the eccentric bushing, with its rollers, can be thrown toward the scoop and push the same away from the scoop-carriage. When the scoops are fastened to the main carriage and the scoop-carriage moves forward and back, the rollers 50 actuate as friction-rollers between the scoops and the scoop-carriage, and when the scoops are not propelled by the scoop-carriage and are opposite their respective chutes of the coal-hopper the handle 53 is used to throw the rollers and, consequently the scoops, clear of the columns of the scoop-carriage. The handles 53 are then reversed and the scoops remain clear of the rollers 50, which positions are essential for the proper tilting of the scoops when they are acting as scale-beams to automatically weigh their contents of coal.

In this application I have invented a device for preventing shocks or jars to the scoop-carriage when it is suddenly stopped or started, which I fully show in Figs. 2, 3, 9, 10, and 11 and consists in providing the chains Q and $Q^3$ with spring-buffers. To the horizontal frame $E^3$ of the column E' a lug 60 is cast, in which a buffer-bolt 61 operates. The said bolt terminates in an eye, to which is secured a hook-bolt 62, which connects with the chain $Q^3$. A buffer-spring 63 works on the bolt 61 between the lug 60 and a stop 64, which takes shocks and jars from this chain. Secured between the lowest braces $b^2$ of the scoop-carriage is the box 65, through one side of which, 66, the eyebolt 67 passes and which carries a buffer-spring 68, working against the said edge 66 and a stop 69. To the bolt 67 a hook-bolt 70 is fastened, which in turn is fastened to the chain Q. It will plainly be seen that any shocks or jars are taken care of consequent to the pulling of the chains Q and $Q^3$ in either direction.

In this apparatus, as already mentioned, I prefer to use a steam-receiver $C^4$, with steam swing-pipes, instead of a boiler and tank, as described in my Letters Patent No. 534,422, dated February 19, 1895. An important feature of the receiver consists in its capacity to supply steam to the main carriage-engine after uncoupling a swing steam-pipe, which is very essential when swing-pipes leading from different centers are so disposed as to be impossible of overlapping each other, but necessitate the main carriage traveling a certain distance between the uncoupling of one swing-pipe and the coupling of another.

I will now proceed to describe the charging operation. First, supposing all the compartments of the hopper H to have been filled under and from elevated bins and the scoop-carriage to be in its rearmost position close to rear uprights $C^2$ on the main carriage, the empty scoops, or as many of them as are to be used, are locked to the scoop-carriage E E' and are then opposite the hoppers, with their front parts tipped up to receive coal from the troughs N of the hoppers. The main carriage is now brought to a position in which the scoops are opposite the retorts. The scoops are next charged from the troughs N, which are kept supplied from the chutes of the hopper, the charging being entirely under the control of the operator. The attendant as he thus loads a scoop watches until it has received the weight of coal necessary for the charge, the weight I being counterbalanced and raised by the coal. The coal thus loaded and weighed in the scoop lies between and in front of the scrapers J² J² J², which are in their rearmost positions in the scoops. The engine E* is now started to run the scoop-carriage forward to carry the coal-laden scoops into the retorts, the front ends of the same being brought not quite to the rear of the retorts, as illustrated by the scoop F² in Fig. 1. In this position the movement of the scoop-carriage, scoop, and scrapers is arrested by the stoppage of the engine; but just before this stoppage occurs the forward movement of the scraper-frames and scrapers had been accelerated by the action of the lever K, (see Fig. 4,) as hereinbefore explained, and the coal in the scoops, which up to that time had its front portion sloping backward from the end of the scoop, is by the said accelerated movement pushed forward into the rear parts of the retorts and against the rear ends of the latter, where the generation of the gas is most effective. The scraper-frames are by the accelerated movements just mentioned brought to such a position that their rear engaging hooks pass the hooks of the locking-bars and both of the plows are pushed to the rear ends of the retorts. To run back the scoop-carriage and scoops, the attendant reverses the engine E*, and during the first part of this movement the scraper-frames are detained by the locking-bars, and the scrapers, with their plows, are held back, and the coal being held back by them is discharged from the scoops into the retorts as the scoops recede. This discharge of the coal from the scoops lightens the front ends and the scrapers are lifted by the weights I and $j'$ on the rear ends of the scoop and the scraper-frame, the scrapers being by this lifting raised nearly clear of the coal in the retorts. When the scoops have run back clear of the coal in the retort, the unlocking-cams $p$ on the scoop-carriage by their actions on the rear portions $r^3$ of the locking-bars liberate the scraper-frames, so that the said frames, with the scrapers and plows, will be free to be drawn back into the scoops by the action of the backing-bar L and the rope or chain M, in combination with the pulleys $l$ $l'$, as hereinbefore explained. The scoops are now in position relatively to the hoppers to be refilled for a repetition of the charging operation when the main carriage shall have been moved to the next retort.

Having described my invention, I desire to secure by United States Letters Patent and claim—

1. In a retort-charging apparatus the combination of a scoop fitted with plows; scraper-frames fitted with plows; a carriage for placing the scoops and scrapers in and withdrawing them from the retorts; locking-bars journaled to the frame of the main carriage for detaining the scraper-frames with its scrapers and plows, while the scoops are withdrawn from the retorts; a backing-bar fitted to slide within each scoop and carrying a pulley; a second pulley attached to each scoop; a rope or chain passing around said pulleys and having its ends attached respectively to a scoop and its scraper-frame; a stop behind each backing-bar substantially as described.

2. In a retort-charging apparatus, the combination of a main carriage, a hopper mounted on the same, a scoop-carriage operating on the main carriage, coal-scoops carried on the scoop-carriage, scraper-frames with scrapers actuating in the scoops, locking-bar-support angles secured to the uprights of the main carriage and to the hopper, locking-bars fulcrumed to the locking-bar-support angles for detaining the scrapers in the retorts, tipping-cams secured to the horizontal braces of the scoop-carriage for unlocking the locking-bars, adjusting-cams attached to the locking-bar-support angles, friction and adjusting rollers secured to the scoops actuated by the adjusting-cams to obtain the proper positions for the scoops to enter the retorts substantially as described.

3. In a retort-charging apparatus, the combination of a main carriage, a scoop-carriage operating on the main carriage, scoops carried on the scoop-carriage, scraper-frames with scrapers operating in the scoops, friction and adjusting rollers actuated by eccentric bushings fastened on a spindle secured to the scoop-carriage, to adjust the lateral horizontal positions of the scoops when inoperative and attached to the main carriage substantially as described.

4. In a retort-charging apparatus, the combination of a main carriage C, C', C², a steam-receiver C⁴, a scoop-carriage E, E', tipping cams $p$, locking-bar angles 24, locking-bars N², and adjusting-cams 30 substantially as described.

5. In a retort-charging apparatus, the combination of a main carriage, a scoop-carriage operating on the main carriage, scoops carried on the scoop-carriage, friction and adjusting rollers 50, eccentric bushings 54 actuating the said rollers, spindle 51 supporting the eccentric bushings, brackets 52 securing the spindle to the scoop-carriage, handle 53 to actuate the said spindle substantially as described.

6. In a retort-charging apparatus the combination of a main carriage; a scoop-carriage; combined crank and locking bolts, each of the latter comprising an axle, a bolt and a crank, disposed so that the bolt can secure a scoop to the scoop-carriage, and that the crank can lock a scoop to the main carriage, the weight of the crank keeping the scoop locked in either position.

7. In a retort-charging apparatus, a scoop-carriage projections 23 on the scoop-carriage, in combination with scoops operating on said carriage, buffer-bolts 21, and springs 22 carried on the scoops, the bolts 21 impinging against projections 23 when the scoops are tilted.

8. In a retort-charging apparatus the combination of a main carriage, an engine mounted thereon to drive the same, a scoop-carriage, an engine on the main carriage to operate the scoop-carriage, a hopper and a steam-receiver secured to the main carriage, scoops operating on the scoop-carriage, buffer-springs connected to the chains running from drum driven by scoop-engine, plows attached to the scoops, scraper-frames operating with the scoops, scrapers and plows carried by the scraper-frames, locking devices for locking the scoops to either carriage, locking-bars for detaining or releasing the scraper-frames, cams on the scoop-carriage for tipping the locking-bars, locking-bar angles connecting frame of main carriage with the hopper, adjusting-cams on the locking-bar angles, adjusting-rollers on the scoops operating with the adjusting-cams on the locking-bar angles, a spindle on the scoop-carriage, friction and adjusting rollers carried on the spindle to adjust the horizontal positions of the scoops substantially as described.

Signed at New York, in the county of New York and State of New York, this 30th day of December, A. D. 1899.

GASTON A. BRONDER.

Witnesses:
S. L. FREMONT,
AUGUST JOHNSTON.